(12) United States Patent
Kim

(10) Patent No.: US 10,666,247 B2
(45) Date of Patent: May 26, 2020

(54) ELECTRONIC DEVICE FOR PREVENTING OVERVOLTAGE

(71) Applicant: SAMSUNG ELECTRONICS CO., LTD., Suwon-si, Gyeonggi-do (KR)

(72) Inventor: Shinho Kim, Uiwang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 296 days.

(21) Appl. No.: 15/713,859

(22) Filed: Sep. 25, 2017

(65) Prior Publication Data

US 2018/0097516 A1     Apr. 5, 2018

(30) Foreign Application Priority Data

Oct. 5, 2016  (KR) .......................... 10-2016-0128380

(51) Int. Cl.
  *G05F 3/08*       (2006.01)
  *H03K 17/0814*    (2006.01)
  (Continued)

(52) U.S. Cl.
  CPC ... *H03K 17/08142* (2013.01); *H01L 27/0251* (2013.01); *H01L 29/78* (2013.01);
  (Continued)

(58) Field of Classification Search
  USPC .......................................... 361/56, 91.1, 111
  See application file for complete search history.

(56) References Cited

U.S. PATENT DOCUMENTS

2005/0078427 A1   4/2005  Castro
2009/0100258 A1*  4/2009  Sung ................. H04M 1/72527
                                                         713/100
(Continued)

FOREIGN PATENT DOCUMENTS

KR          10-1272762          6/2013

OTHER PUBLICATIONS

Search Report and Written Opinion dated Jan. 15, 2018 in counterpart International Patent Application No. PCT/KR2017/010478.
(Continued)

*Primary Examiner* — Danny Nguyen
(74) *Attorney, Agent, or Firm* — Nixon & Vanderhye P.C.

(57) ABSTRACT

An electronic device includes a connector for connection to an external device; a controller electrically connected to a first external device detection terminal of the connector to detect an electric state of the first external device detection terminal and to output a signal corresponding to the detected electric state; a processor having a first input terminal electrically connected to the controller, that is configured to receive the signal through the first input terminal, having a second input terminal electrically connected to a second external device detection terminal of the connector, and that is configured to detect an electric state of the second external device detection terminal; and an electronic component disposed between the second external device detection terminal and the processor such that an overvoltage is not entered into the processor through the second input terminal. Various example embodiments are available.

14 Claims, 9 Drawing Sheets

(51) Int. Cl.
  *H02H 9/04* (2006.01)
  *H01L 27/02* (2006.01)
  *H01L 29/78* (2006.01)
  *H03K 17/08* (2006.01)
  *H03K 17/30* (2006.01)
  *G06F 21/44* (2013.01)
  *G06F 13/40* (2006.01)
  *H01R 24/28* (2011.01)

(52) U.S. Cl.
  CPC .............. *H02H 9/04* (2013.01); *H02H 9/046* (2013.01); *H03K 17/08* (2013.01); *H03K 17/302* (2013.01); *G05F 3/08* (2013.01); *G06F 13/40* (2013.01); *G06F 21/44* (2013.01); *H01R 24/28* (2013.01)

(56) References Cited

U.S. PATENT DOCUMENTS

| | | |
|---|---|---|
| 2010/0073837 A1 | 3/2010 | Predtetchenski et al. |
| 2010/0165528 A1* | 7/2010 | Chan ................. H04L 12/40045 361/86 |
| 2012/0250204 A1* | 10/2012 | Wada .................... H02H 3/207 361/86 |
| 2013/0335865 A1 | 12/2013 | Kim |
| 2014/0059363 A1* | 2/2014 | Shao ........................ H02J 7/00 713/300 |
| 2014/0211351 A1 | 7/2014 | Shoykhet et al. |
| 2016/0190794 A1* | 6/2016 | Forghani-Zadeh ...... H02H 7/20 361/86 |

OTHER PUBLICATIONS

European Extended Search Report dated Aug. 29, 2019 for EP Application No. 17858645.9.
USB Type-C Power Delivery Controller; BM92A30MWV-Z; XP055614650.
USB Type C Current Advertisement Controller; LD8200A; XP055614655.
USB Type-C Port Controller; EZ-PD CCG2 Datasheet; XP055421081.
Koltun; Circuit Protection for USB Type-C; XP056614375.

* cited by examiner

ELECTRONIC DEVICE FOR PREVENTING OVERVOLTAGE

CROSS-REFERENCE TO RELATED APPLICATION

This application is based on and claims priority under 35 U.S.C. § 119 to Korean Patent Application No. 10-2016-0128380 filed on Oct. 5, 2016, the disclosure of which is incorporated by reference herein in its entirety.

BACKGROUND

Field

The present disclosure relates generally to an electronic device having a configuration for preventing and/or reducing an overvoltage from being entered into the electronic device through an interface for connection to an external device.

Description of Related Art

Electronic devices (e.g., a smart phone, a tablet personal computer (PC)) may include an interface (e.g., a Universal Serial Bus (USB) interface) for charge or data communication. When an overvoltage is entered into the electronic device through such an interface, an electronic component (e.g., processor) thereof may be damaged, and thus, the electronic device may not be used.

SUMMARY

The present disclosure has been made in view of the above problem and provides an electronic device having a configuration that can prevent and/or reduce an electronic component from being damaged because of an overvoltage entered through an interface.

In accordance with an example aspect of the present disclosure, an electronic device includes a connector configured to provide a connection to an external device; a controller electrically connected to a first external device detection terminal of the connector and configured to detect an electrical state of the first external device detection terminal and to output a signal corresponding to the detected electrical state; a processor including a first input terminal electrically connected to the controller, is the processor being configured to receive the signal through the first input terminal, the processor further including a second input terminal electrically connected to a second external device detection terminal of the connector, and configured to detect an electrical state of the second external device detection terminal; and an electronic circuit disposed between the second external device detection terminal and the processor and configured to protect the processor from receiving an overvoltage through the second input terminal.

BRIEF DESCRIPTION OF THE DRAWINGS

The above and/or other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
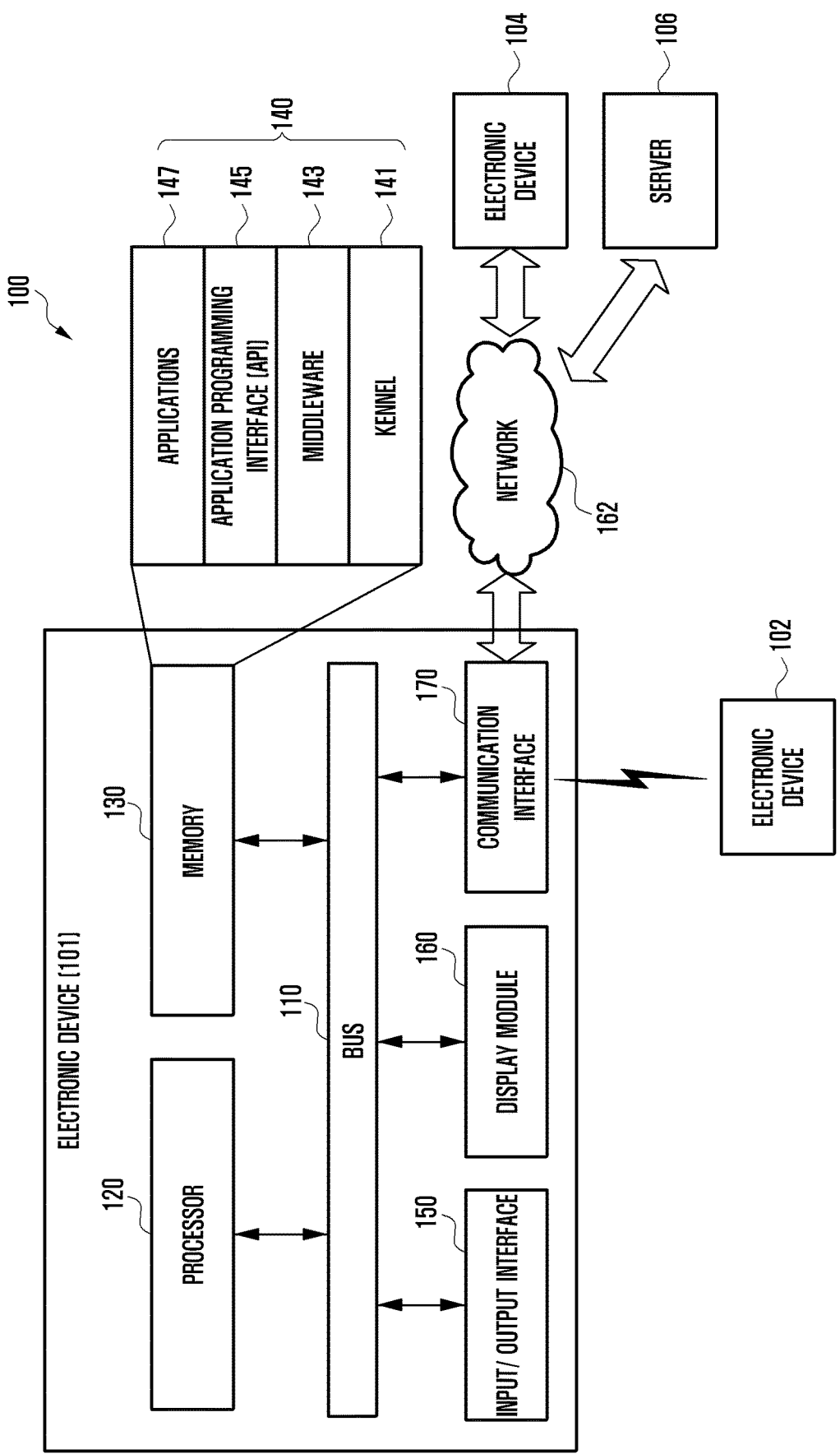
FIG. 1 is a block diagram illustrating an example configuration of an electronic device in a network environment according to various example embodiments of the present disclosure.

The following description with reference to the accompanying drawings is provided to aid in a comprehensive understanding of various example embodiments of the present disclosure as defined by the claims and their equivalents. It includes various details to assist in that understanding, but these are to be regarded as merely examples. Accordingly, those of ordinary skill in the art will recognize and understand that various changes and modifications of the various example embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various example embodiments of the present disclosure is provided for illustration purposes only and not for the purpose of limiting the present disclosure as defined by the appended claims and their equivalents.

It is to be understood that the singular forms "a," "an," and "the" include the plural form unless the context clearly dictates otherwise. Thus, for example, reference to "a component surface" includes reference to one or more of such surfaces.

The term "include" or "may include" which may be used in describing various example embodiments of the present disclosure may refer, for example, to the existence of a corresponding disclosed function, operation or component which can be used in various example embodiments of the present disclosure and does not limit one or more additional functions, operations, or components. In various example embodiments of the present disclosure, the terms such as "include" or "have" may be construed to denote a certain characteristic, number, operation, constituent element, component or a combination thereof, but may not be construed to exclude the existence of or a possibility of the addition of one or more other characteristics, numbers, operations, constituent elements, components or combinations thereof.

In various example embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various example embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device may indicate different user devices although both of them are user devices. Similarly, without departing from the scope of the present disclosure, a first structural element may be referred to as a second structural element. The second structural element also may be referred to as the first structural element.

When it is stated that a component is "coupled to" or "connected to" another component, the component may be directly coupled or connected to another component or a further component may exist between the component and another component. On the other hand, when it is stated that a component is "directly coupled to" or "directly connected to" another component, an additional component does not exist between the component and another component.

The terms used in describing various example embodiments of the present disclosure are only examples for describing a specific embodiment but do not limit the various embodiments of the present disclosure.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various example embodiments of the present disclosure may be a device including a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, and a wearable device (e.g., a head-mounted-device (HMD) such as electronic glasses, electronic clothes, an electronic bracelet, an electronic necklace, an electronic accessory, an electronic tattoo, and a smart watch), or the like, but is not limited thereto.

According to some example embodiments of the present disclosure, the electronic device may be a smart home appliance having a communication function. The smart home appliance may include at least one of a television (TV), a digital versatile disc (DVD) player, an audio player, an air conditioner, a cleaner, an oven, a microwave oven, a washing machine, an air cleaner, a set-top box, a TV box (e.g., Samsung HomeSync™, Apple TV™, or Google TV™), game consoles, an electronic dictionary, an electronic key, a camcorder, and an electronic frame, or the like, but is not limited thereto.

According to some example embodiments, the electronic device may include at least one of various types of medical devices (e.g., magnetic resonance angiography (MRA), magnetic resonance imaging (MRI), computed tomography (CT), a scanner, an ultrasonic device and the like), a navigation device, a global navigation satellite system (GNSS) receiver, an event data recorder (EDR), a flight data recorder (FDR), a vehicle infotainment device, electronic equipment for a ship (e.g., a navigation device for ship, a gyro compass and the like), avionics, a security device, a head unit for a vehicle, an industrial or home robot, an automatic teller machine (ATM) of financial institutions, a point of sale (POS) device of shops, and a device for Internet of things (IoT) (e.g., a fire alarm, various sensors, electric or gas meter units, a sprinkler, a thermostat, a streetlamp, a toaster, sport outfits, a hot-water tank, a heater, a boiler and the like), or the like, but is not limited thereto.

According to some example embodiments of the present disclosure, the electronic device may include at least one of furniture or a part of a building/structure, an electronic board, an electronic signature receiving device, a projector, and various types of measuring devices (e.g., a water meter, an electricity meter, a gas meter, a radio wave meter and the like) including a camera function, or the like, but is not limited thereto. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various example embodiments of the present disclosure will be described with reference to the accompanying drawings. The term "user" used in various embodiments may refer to a person who uses an electronic device or a device (e.g., an artificial intelligence electronic device) which uses an electronic device.

FIG. 1 is a diagram illustrating an example network environment 100 including an electronic device 101 according to various example embodiments of the present disclosure.

Referring to FIG. 1, the electronic device 101 may include various components including a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit connecting the above described components and transmitting communication (e.g., a control message) between the above described components.

The processor 120 may include various processing circuitry and receive commands from other components (e.g., the memory 130, the input/output interface 150, the display 160, or the communication interface 170) through the bus 110, analyze the received commands, and execute calculation or data processing according to the analyzed commands.

The memory 130 stores commands or data received from the processor 120 or other components (e.g., the input/output interface 150, the display 160, or the communication interface 170) or generated by the processor 120 or other components. The memory 130 may store a software and/or a program 140. For example, the program 140 may include a kernel 141, middleware 143, an application programming interface (API) 145, and an application program (or an application) 147. At least part of the kernel 141, the middleware 143 or the API 145 may refer to an operating system (OS).

The kernel 141 controls or manages system resources (e.g., the bus 110, the processor 120, or the memory 130) used for executing an operation or function implemented by the remaining other programming modules, for example, the middleware 143, the API 145, or the application 147. The kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. In operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 101 can be used, to the application 147.

The API 145 is an interface by which the application 147 can control a function provided by the kernel 141 or the middleware 143 and includes, for example, at least one interface or function (e.g., command) for a file control, a window control, image processing, or a character control.

The application 147 may include a short message service (SMS)/multimedia messaging service (MMS) application, an email application, a calendar application, an alarm application, a health care application (e.g., application measuring quantity of exercise or blood sugar) or an environment information application (e.g., application providing information on barometric pressure, humidity or temperature). The application 147 may be an application related to an information exchange between the electronic device 101 and an external electronic device (e.g., second external electronic device 104). The application 147 related to the information exchange may include, for example, a notification relay application for transferring particular information to the external electronic device or a device management application for managing the external electronic device.

For example, the notification relay application may include a function of transmitting notification information generated by another application (e.g., an SMS/MMS application, an email application, a health care application or an environment information application) of the electronic device 101 to the external electronic device (e.g., second external electronic device 104). The notification relay application may receive notification information from, for example, the second external electronic device 104, and provide the received notification information to the user. The device management application may manage (e.g., install, remove, or update) at least a part of functions of the electronic device. For example, the device management application may turn on/off the external electronic device (or some components of the external electronic device), control a brightness of the display of the external electronic device or communicate with the electronic device 101, an application executed in the second external electronic device 104, or a service (e.g., call service or message service) provided by the second external electronic device 104.

The application 147 may include an application designated according to an attribute (e.g., type of electronic device) of the second external electronic device 104. For example, when the second external electronic device 104 is a moving picture experts group (MPEG-1 or MPEG-2) audio layer-3 (MP3) player, the application 147 may include an application related to music reproduction. Similarly, when the second external electronic device 104 is a mobile medical device, the application 147 may include an application related to health care. The application 147 may include at least one of an application designated to the electronic device 101 and an application received from an external electronic device (e.g., a server 106 or the second external electronic device 104).

The input/output interface 150 may include various input/output circuitry and/or devices and transmits a command or data input from the user through an input/output device (e.g., a sensor, a keyboard, or a touch screen) to the processor 120, the memory 130, the communication interface 170, or the display 160 through, for example, the bus 110. For example, the input/output interface 150 may provide data on a user's touch input through a touch screen to the processor 120. Further, the input/output interface 150 may output a command or data received through, for example, the bus 110, from the processor 120, the memory 130, or the communication interface 170 through the input/output device (e.g., a speaker or a display). For example, the input/output interface 150 may output voice data processed through the processor 120 to the user through the speaker.

The display 160 may include, for example, liquid crystal display (LCD), flexible display, transparent display, light-emitting diode (LED) display, organic LED (OLED) display, microelectromechanical systems (MEMS) display, or electronic paper display, or the like, but is not limited thereto. The display 160 may visually offer, for example, various content (e.g., text, image, video, icon, symbol, etc.) to users. The display 160 may include a touch screen and receive, for example, a touch, gesture, proximity, or hovering input using an electronic pen or a user's body. The display 160 may be one or more displays. For example, the display 160 may be included in the electronic device 101 or included in an external device (e.g., a first external electronic device 102 or the second external electronic device 104) having a wired or wireless connection with the electronic device 101, thus outputting information offered by the electronic device 101 to users.

The display 160 may be attachable to or detachable from the electronic device 101. For example, the display 160 may include an interface which can be mechanically or physically connected with the electronic device 101. In case the display 160 is detached (e.g., separated) from the electronic device 101 by a user's selection, the display 160 may receive various control signals or image data from the processor 120, e.g., through wireless communication.

The communication interface 170 may include various communication circuitry and establish communication between the electronic device 101 and any external device (e.g., the first external electronic device 102, the second external electronic device 104, or the server 106). For example, the communication interface 170 may be connected with a network 162 through wired or wireless communication and thereby communicate with any external device (e.g., the first external electronic device 102, the second external electronic device 104, or the server 106). Additionally, the communication interface 170 may establish a short-range wireless communication with an external electronic device, such as, for example, and without limitation, external electronic devices 102, 104, or the like.

The electronic device 101 may be connected with the first external electronic device 102 and the second external electronic device 104 without using the communication interface 170. For example, based on at least one of a magnetic sensor, a contact sensor, a light sensor, and the like that is equipped in the electronic device 101, the electronic device 101 may sense whether at least one of the first and second external electronic devices 102 and 104 is contacted with at least part of the electronic device 101, or whether at least one of the first and second external electronic devices 102 and 104, respectively, is attached to at least part of the electronic device 101.

Wireless communication may use, as cellular communication protocol, at least one of long-term evolution (LTE), LTE-advance (LTE-A), code division multiple access (CDMA), wideband CDMA (WCDMA), universal mobile telecommunications system (UMTS), wireless broadband (WiBro), global system for mobile communications (GSM), and the like. A short-range communication 163 may include, for example, at least one of Wi-Fi, Bluetooth (BT), near field communication (NFC), magnetic secure transmission or near field magnetic data stripe transmission (MST), and GNSS, and the like. The GNSS may include at least one of, for example, a global positioning system (GPS), a Glonass, a Beidou navigation satellite system (hereinafter, referred to as "Beidou"), and European global satellite-based navigation system (Galileo). Hereinafter, the "GPS" may be interchangeably used with the "GNSS" in the present disclosure. Wired communication may include, for example, at least one of universal serial bus (USB), high definition multimedia interface (HDMI), recommended standard-232 (RS-232), plain old telephone service (POTS), and the like. The network 162 may include telecommunication network, for example, at least one of a computer network (e.g., local area network (LAN) or wide area network (WAN)), internet, and a telephone network.

The first and second external electronic devices 102 and 104 may be identical to, or different from, the electronic device 101. The first and second external electronic devices 102 and 104 may include, for example, a plurality of electronic devices. The server 106 may include a single server or a group of servers. All or part of operations executed in the electronic device 101 may be executed in other electronic device(s), such as the first and second external electronic devices 102 and 104 or the server 106.

In case the electronic device 101 is required to perform a certain function or service automatically or by request, the electronic device 101 may request another device (e.g., the first external electronic device 102 or the second external electronic device 104 or the server 106) to execute instead, or additionally at least part, of at least one or more functions associated with the required function or service. The requested device may execute the requested function and deliver the result of execution to the electronic device 101. Then, the electronic device 101 may offer the required function or service, based on the received result or by processing the received result. For the above, cloud computing technology, distributed computing technology, or client-server computing technology may be used, for example.

Figure 2:
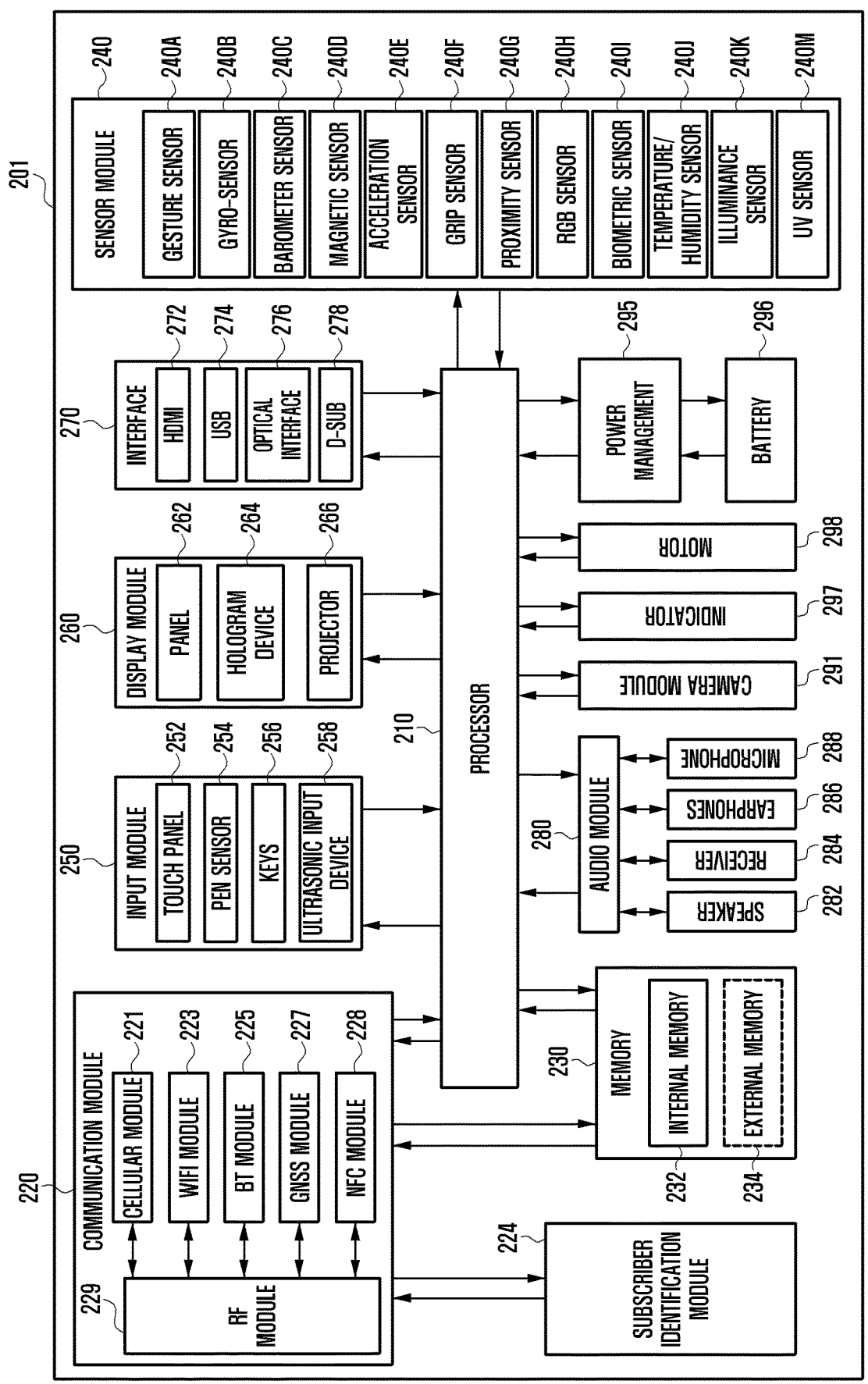
FIG. 2 is a block diagram illustrating an example configuration of an electronic device according to various example embodiments of the present disclosure.

FIG. 2 is a block diagram illustrating an example configuration of an electronic device according to an example embodiment of the present disclosure.

Referring to FIG. 2, for example, the electronic device 201 may include part or all of the components in the electronic device 101 illustrated in FIG. 1. The electronic device 201 may include one or more processors (e.g., including processing circuitry) 210 (e.g., application processors (APs)), a communication module (e.g., including communication circuitry) 220, a subscriber identification module (SIM) 224, a memory 230, a sensor module 240, an input module (e.g., including input circuitry) 250, a display module 260, an interface (e.g., including interface circuitry) 270, an audio module 280, a camera module 291, a power management module 295, a battery 296, an indicator 297, and a motor 298.

The processor 210 may include various processing circuitry, such as, for example, and without limitation, a dedicated processor, a CPU, an application processor, an application specific integrated circuit, or the like, and is capable of driving, for example, an OS or an application program to control a plurality of hardware or software components connected to the processor 210, processing various data, and performing operations. The processor 210 may be implemented as, for example, a system on chip (SoC). The processor 210 may further include a graphic processing unit (GPU) and/or an image signal processor (ISP). The processor 210 may also include at least part of the components illustrated in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 illustrated in FIG. 1. For example, the communication module 220 may include various communication circuitry, such as, for example, and without limitation, the cellular module 221, a Wi-Fi module 223, a BT module 225, a GNSS module 227 (e.g., a GPS module, Glonass module, Beidou module or Galileo module), an NFC module 228, and a radio frequency (RF) module 229.

The cellular module 221 is capable of providing a voice call, a video call, an SMS service, an Internet service, etc., through a communication network, for example. The cellular module 221 is capable of identifying and authenticating the electronic device 201 in a communication network by using the SIM 224 (e.g., a SIM card). The cellular module 221 may be capable of performing at least part of the functions provided by the processor 210. The cellular module 221 may also include a communication processor (CP).

Each of the Wi-Fi module 223, the BT module 225, the GNSS module 227, and the NFC module 228 may include a processor and various communication circuitry for processing data transmitted or received through the corresponding module. At least part of the cellular module 221, Wi-Fi module 223, BT module 225, GNSS module 227, and NFC module 228, (e.g., two or more modules) may be included in one integrated chip (IC) or one IC package.

The RF module 229 is capable of transmission/reception of communication signals, e.g., RF signals. The RF module 229 may include a transceiver, a power amp module (PAM), a frequency filter, a low noise amplifier (LNA), an antenna, etc. According to another embodiment of the present disclosure, at least one of the following modules cellular module 221, Wi-Fi module 223, BT module 225, GNSS module 226, NFC module 228, and MST module is capable of transmission/reception of RF signals through a separate RF module.

The SIM module 224 may include a card including a SIM and/or an embodied SIM. The SIM module 224 may also contain unique identification information, e.g., integrated circuit card identifier (ICCID), or subscriber information, e.g., international mobile subscriber identity (IMSI).

The memory 230 (e.g., memory 130 illustrated in FIG. 1) may include a built-in internal memory 232 and/or an external memory 234. The built-in internal memory 232 may include at least one of the following a volatile memory, e.g., a dynamic random access memory (DRAM), a static RAM (SRAM), a synchronous dynamic RAM (SDRAM), etc., and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, e.g., a compact flash (CF), a secure digital (SD), a micro-SD, a mini-SD, an extreme digital (xD), a multi-media card (MMC), a memory stick, etc. The external memory 234 may be connected to the electronic device 201, functionally and/or physically, through various interfaces.

The memory 230 may store payment information and a payment application serving as one of the application programs. The payment information may refer to credit card numbers and personal identification numbers (PINs), corresponding to a credit card. The payment information may also include user authentication information, e.g., fingerprints, facial features, voice information, etc.

The sensor module 240 may measure/detect a physical quantity or an operation state of the electronic device 201, and convert the measured or detected information into an electrical signal. The sensor module 240 may include at least one of the following a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illuminance sensor 240K, and an ultraviolet (UV) sensor 240M. Additionally or alternatively, the sensor module 240 may also include an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling one or more sensors included therein. The electronic device 201 may include a processor, configured as part of the processor 210 or a separate component, for controlling the sensor module 240. In this case, while the processor 210 is operating in sleep mode, the processor may control the sensor module 240.

The input module 250 may include various input circuitry, such as, for example, and without limitation, a touch panel 252, a digital pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer to offer a tactile feedback to a user. The touch panel 252 may include a pressure sensor (or a force sensor) capable of measuring the strength or pressure of a user's touch. This pressure sensor may be formed integrally with or separately from the touch panel 252.

The digital pen sensor 254 may be a part of the touch panel or include a separate sheet for recognition. The key 256 may include, for example, a physical button, an optical key, or a keypad. The ultrasonic input device 258 may detect ultrasonic waves occurring at an input tool through a microphone (e.g., 288) and thereby identify data corresponding to the detected ultrasonic waves.

The display 260 may include a panel 262, a hologram device 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram device 264 may show a stereoscopic image in the air by using light interference. The projector 266 may display an image by projecting light onto a screen. The screen may be located inside or outside of the electronic device 201. The display 260 may further include a control circuit for controlling the panel 262, the hologram device 264, or the projector 266.

The interface 270 may include various interface circuitry, such as, for example, and without limitation, a high-definition multimedia interface (HDMI) 272, a USB 274, an optical interface 276, or a D-subminiature (D-sub) 278. The interface 270 may be included in the communication interface 170 shown in FIG. 1. Additionally or alternatively, the interface 270 may include a mobile high-definition link (MHL) interface, a SD card/MMC interface, or an infrared data association (IrDA) standard interface.

The audio module 280 may provide bidirectional conversion between a sound and an electronic signal. At least part of the components in the audio module 280 may be included in the input/output interface 150 shown in FIG. 1. The audio module 280 may process sound information input or output through a speaker 282, a receiver 284, earphones 286, microphone 288, etc.

The camera module 291 may take both still and moving images. The camera module 291 may include one or more image sensors (e.g., a front image sensor or a rear image sensor), a lens, an ISP, a flash (e.g., an LED or xenon lamp), etc.

The power management module 295 is capable of managing power of the electronic device 201. The power management module 295 may include a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge may measure the residual capacity, charge in voltage, current, or temperature of the battery 296. The battery 296 takes the form of either a rechargeable battery or a solar battery.

The indicator 297 may display a specific status of the electronic device 201 or a part thereof (e.g., the processor 210), e.g., a boot-up status, a message status, a charging status, etc. The motor 298 may convert an electrical signal into mechanical vibrations, such as, a vibration effect, a haptic effect, etc. Although not shown, the electronic device 201 may further include a processing unit (e.g., GPU) for supporting a mobile TV. The processing unit for supporting a mobile TV is capable of processing media data pursuant to standards, e.g., digital multimedia broadcasting (DMB), digital video broadcast (DVB), or mediaFlo™, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 3:
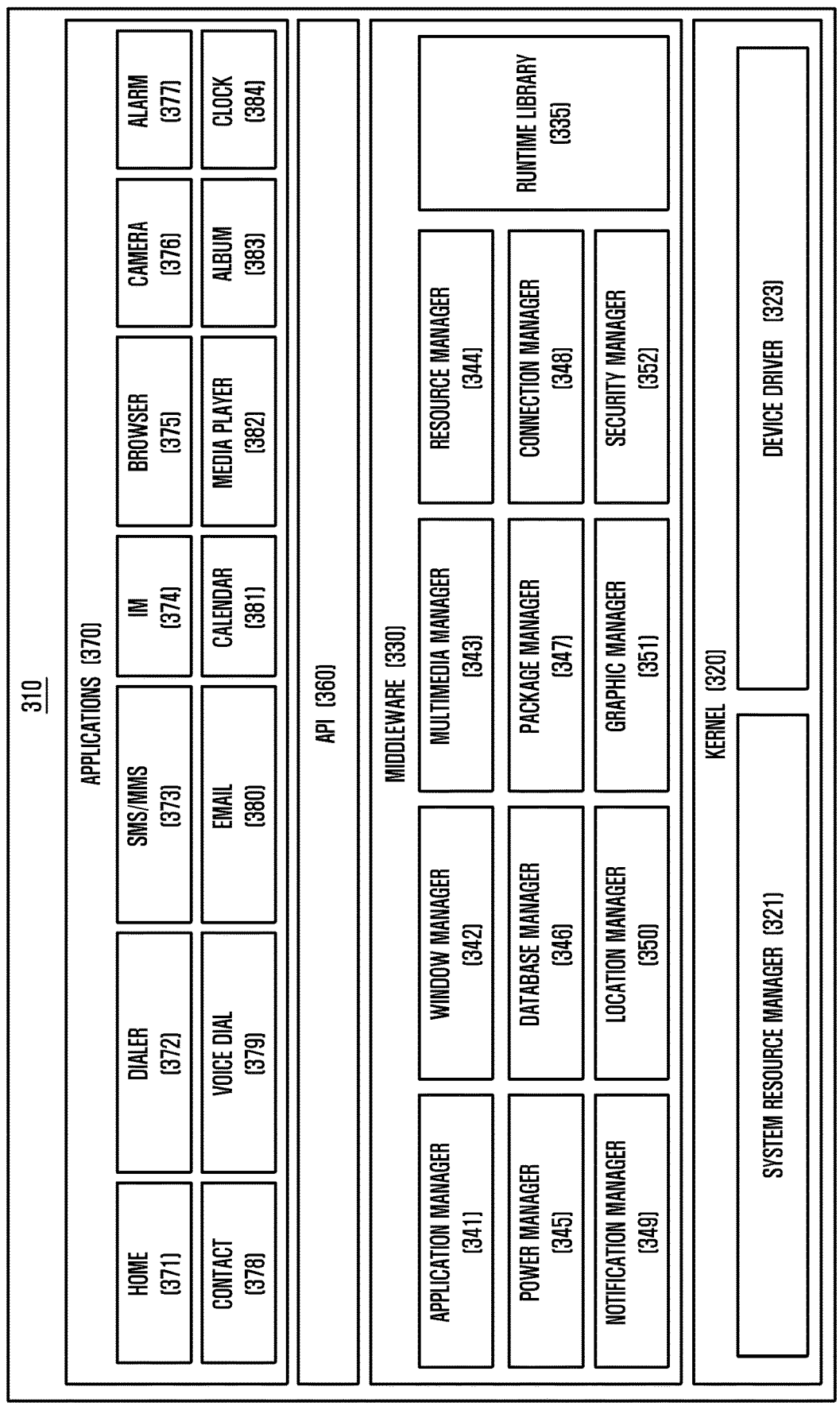
FIG. 3 is a block diagram illustrating an example configuration of a program module according to various example embodiments of the present disclosure.

FIG. 3 is a block diagram illustrating an example programming module according to an example embodiment of the present disclosure.

Referring to FIG. 3, the program module 310 (e.g., program 140 shown in FIG. 1) may include an OS for controlling resources related to the electronic device (e.g., electronic device 11) and/or various applications (e.g., application 147 shown in FIG. 1) running on the OS. The OS may be Android, iOS, Windows, Symbian, Tizen, Bada, or the like, but is not limited thereto.

The program module 310 may include a kernel 320, middleware 330, API 360 and/or applications 370. At least part of the program module 310 may be preloaded on the electronic device or downloaded from a server (e.g., the first external electronic device 102 or the second external electronic device 104, the server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a BT driver, a shared memory driver, a USB driver, a keypad driver, a Wi-Fi driver, and an audio driver. Further, the device driver 312 may include an inter-process communication (IPC) driver.

The middleware 330 may provide a function required in common by the applications 370. The middleware 330 may provide a function through the API 360 to allow the applications 370 to efficiently use limited system resources within the electronic device. The middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment of the present disclosure, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a basic input/output system (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as Wi-Fi or BT. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface (UI) related to the graphic effect. The security manager 352 provides a general security function required for a system security or a user authentication. When the electronic device (for example, the electronic device 101) has a call function, the middleware 330 may further include a telephony manager for managing a voice of the electronic device or a video call function.

The middleware 330 may include modules configuring various combinations of functions of the above described components. The middleware 330 may provide modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an OS. For example, in Android or iOS, a single API set may be provided for each platform. In Tizen, two or more API sets may be provided.

The applications 370 (e.g., application 147) may include one or more applications for performing various functions, for example, and without limitation, home 371, dialer 372, SMS/MMS 373, instant message (IM) 374, browser 375, camera 376, alarm 377, contact 378, voice dial 379, email 380, calendar 381, media player 382, album 383, clock 384. Additionally, or alternatively, though not shown, the applications 370 may include various other applications, such as, for example, and without limitation, health care (e.g., an application for measuring amount of exercise, blood sugar level, etc.), and environment information (e.g., an application for providing atmospheric pressure, humidity, temperature, etc.).

The applications 370 may include an application for supporting information exchange between an electronic device (e.g., the electronic device 101) and an external device (e.g., the first and second external electronic devices 102 and 104), which is hereafter called 'information exchange application'). The information exchange application is capable of including a notification relay application for relaying specific information to external devices or a device management application for managing external devices.

For example, the notification relay application may include a function for relaying notification information, created in other applications of the electronic device (e.g., SMS/MMS application, email application, health care application, environment information application, etc.) to external devices (e.g., electronic devices 32 and 34). In addition, the notification relay application is capable of receiving notification information from external devices to provide the received information to the user.

The device management application may manage (e.g., install, remove or update) at least one function of an external device (e.g., the first and second external electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

The applications 370 may include an application (e.g., a health care application of a mobile medical device, etc.) specified attributes of an external device (e.g., the first and second external electronic devices 102 and 104). The applications 370 may include applications received from an external device (e.g., the server 106, the first and second external electronic devices 102 and 104). The applications 370 may include a preloaded application or third party applications that can be downloaded from a server. It should be understood that the components of the program module 310 may be called different names according to types of OS.

According to various example embodiments of the present disclosure, at least part of the program module 310 can be implemented with software, firmware, hardware, or any combination thereof. At least part of the program module 310 can be implemented (e.g., executed) by a processor (e.g., processor 120). At least part of the programing module 310 may include modules, programs, routines, sets of instructions or processes, etc., in order to perform one or more functions.

The term 'module' as used in various example embodiments of the present disclosure may refer, for example, to a unit including one of hardware, software, and firmware or any combination thereof. The 'module' may be interchangeable with the term 'unit,' 'logic,' 'logical block,' 'component,' or 'circuit.' The 'module' may be the smallest unit of an integrated component or a part thereof. The 'module' may be the smallest unit that performs one or more functions or a part thereof. The 'module' may be mechanically or electronically implemented. For example, the 'module' according to various embodiments of the present disclosure may include, for example, and without limitation, at least one of a dedicated processor, a CPU, application-specific integrated circuit (ASIC) chips, field-programmable gate arrays (FPGAs), and programmable-logic devices for performing certain operations, which are now known or will be developed in the future.

At least part of the method (e.g., operations) or system (e.g., modules or functions) according to various embodiments of the present disclosure can be implemented with instructions as programming modules that may be stored in computer-readable storage media. One or more processors (e.g., processor 120) can execute instructions, thereby performing the functions. An example of the computer-readable storage media may be the memory 130. At least part of the programming modules can be implemented (executed) by a processor. At least part of the programming module may include modules, programs, routines, sets of instructions or processes, etc., in order to perform one or more functions.

Examples of computer-readable media include magnetic media, such as hard disks, floppy disks, and magnetic tape, optical media such as compact disc-ROM (CD-ROM) disks and DVD, magneto-optical media, such as floptical disks, and hardware devices that are specially configured to store and perform program instructions (e.g., programming modules), such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to various embodiments of the present disclosure may include one or more components, remove part of them described above, or include new components. The operations performed by modules, programming modules, or the other components, according to various embodiments of the present disclosure, may be executed in serial, parallel, repetitive or heuristic fashion. Part of the operations can be executed in any other order, skipped, or executed with additional operations.

The various example embodiments described in the present disclosure are merely provided to assist in a comprehensive understanding of the disclosure and the technology thereof and are not suggestive of limitation. Although various example embodiments of the disclosure have been described in detail above, it should be understood that many variations and modifications of the disclosure herein described, which may be apparent to those skilled in the art, will still fall within the spirit and scope of the various example embodiments of the disclosure as defined in the appended claims.

Figure 4A:
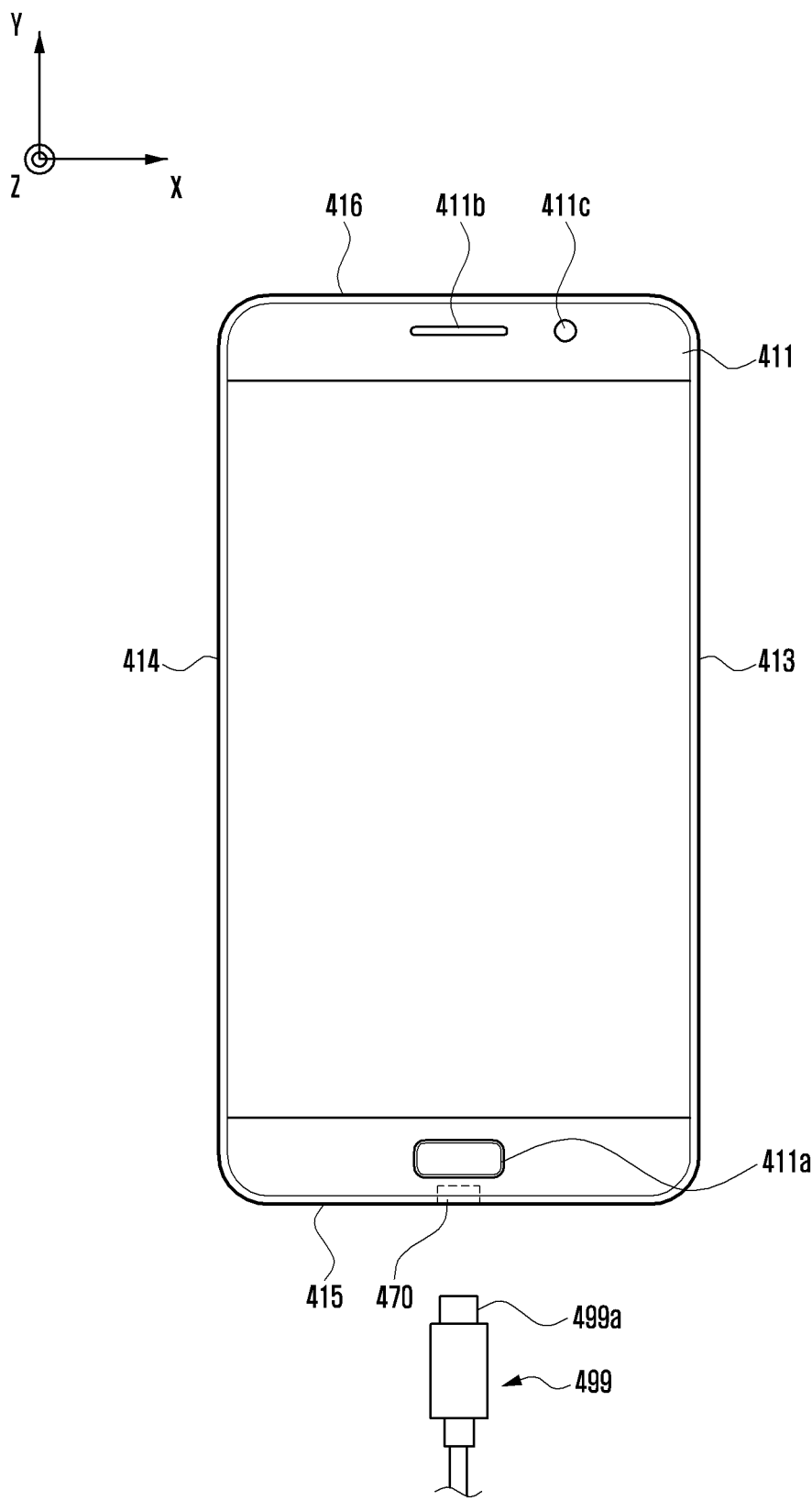
FIG. 4A is a diagram illustrating an example electronic device according to various example embodiments of the present disclosure.
Figure 4B:
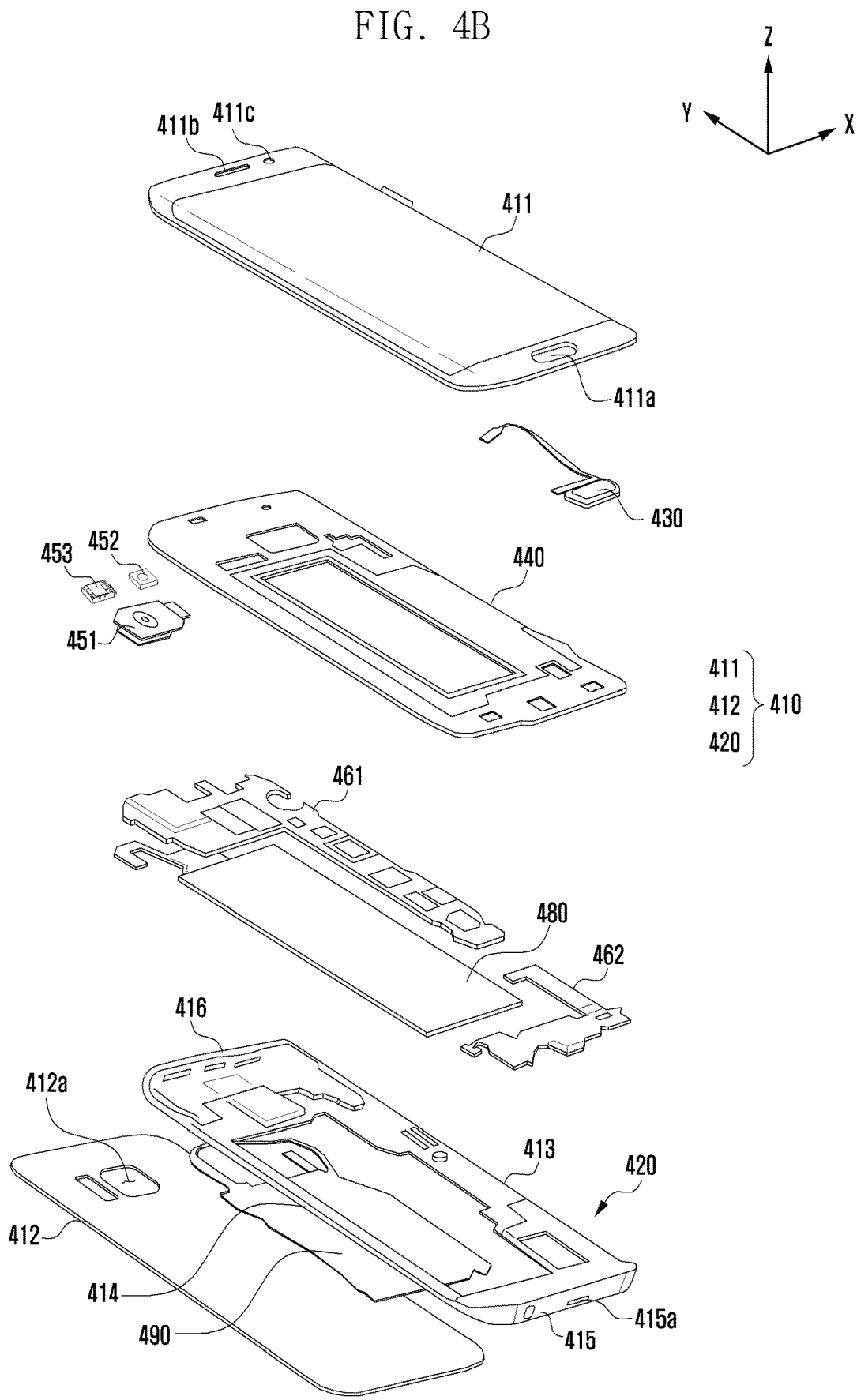
FIG. 4B is an exploded perspective view illustrating an example electronic device according to various example embodiments of the present disclosure.

FIGS. 4A and 4B are diagrams illustrating an example electronic device according to various example embodiments of the present disclosure. FIG. 4A is a diagram illustrating a front surface of an electronic device, and FIG. 4B is an exploded perspective view illustrating an example electronic device according to various example embodiments of the present disclosure.

With reference to FIGS. 4A and 4B, the electronic device (e.g., the electronic device 201) may include various electronic components and a housing 410 as an external structure for protecting the various electronic components. The housing may include a first surface 411 facing in a first direction, a second surface 412 facing in a second direction substantially opposite to the first direction, and a side member 420 that encloses at least a portion of a space between the first surface 411 and the second surface 412. For example, the first surface 411 may be a cover including a front surface of the electronic device, and a display may be exposed through at least a portion of the front surface. The second surface 412 may be a cover including a rear surface of the electronic device. The side member 420 may include a right side cover 413 including a right side surface of the electronic device, a left side cover 414 including a left side surface of the electronic device, a lower side cover 415 including a lower side surface of the electronic device, and an upper side cover 416 including an upper side surface of the electronic device.

A fingerprint sensor 430, support structure 440 configured to support the first surface 411, rear camera 451, front camera 452, receiver 453, first substrate 461, second substrate 462, socket 470 (or receptacle), battery 480, and antenna 490 may be positioned within the housing 410.

The fingerprint sensor 430 may be electrically connected to the first substrate 461 and/or the second substrate 462, recognize a contact of a fingerprint in at least a portion (e.g., the display 160 or a home key 411a) of the first surface 411, generate fingerprint data, and output the fingerprint data to the processor (e.g., the processor 210) mounted in the first substrate 461.

The rear camera 451 may be mounted in the first substrate 461 to be exposed through a hole 412a formed in the second surface 412.

The front camera 452 may be mounted in the first substrate 461 to be exposed through a hole 411c formed in the first surface 411.

The receiver 453 may be mounted in the first substrate 461 to be exposed through a hole 411b formed in the first surface 411. With reference to FIG. 4B, the rear camera 451 may be positioned under the receiver 453, and the front camera 452 may be positioned at the right side of the rear camera 451.

The first substrate 461 may be positioned adjacent to the upper side cover 416 and be electrically connected to the upper side cover 416. The second substrate 462 may be positioned adjacent to the lower side cover 415 and be electrically connected to the lower side cover 415.

The socket 470 is electrically connected to an external device, for example, a cable 499, includes a plurality of terminals (in order words, pins), and may be exposed to the outside through a hole 415a formed in the lower side cover 415. Further, the socket 470 may be electrically connected to a controller (e.g., the Universal Serial Bus (USB) 274) or a processor (e.g., the processor 210) mounted in a substrate (e.g., the first substrate 461 or the second substrate 462). The cable 499 electrically connects the electronic device (e.g., the electronic device 201) and another electronic device, and when a plug 499a of the cable 499 is inserted into the hole 415a, terminals of the plug 499a may contact terminals, respectively, formed in the socket 470. An electric state (e.g., a voltage or a current) may be changed according to the contact. The controller (e.g., the USB 274) or the processor (e.g., the processor 210) may detect a connection to the cable 499 using a change of an electric state of a terminal and distinguish a kind (e.g., an adaptor, a computer) of another electronic device connected to the cable 499. The controller (e.g., the USB 274) or the processor (e.g., the processor 210) may control various operations (e.g., data communication with another electronic device) or power delivery (PD) of the battery 480 based on identification information.

The antenna 490 may include a plurality of coil antennas for payment and may be electrically connected to a communication module (e.g., NFC the module 228) mounted in a substrate (e.g., the first substrate 461 or the second substrate 462).

Figure 5:
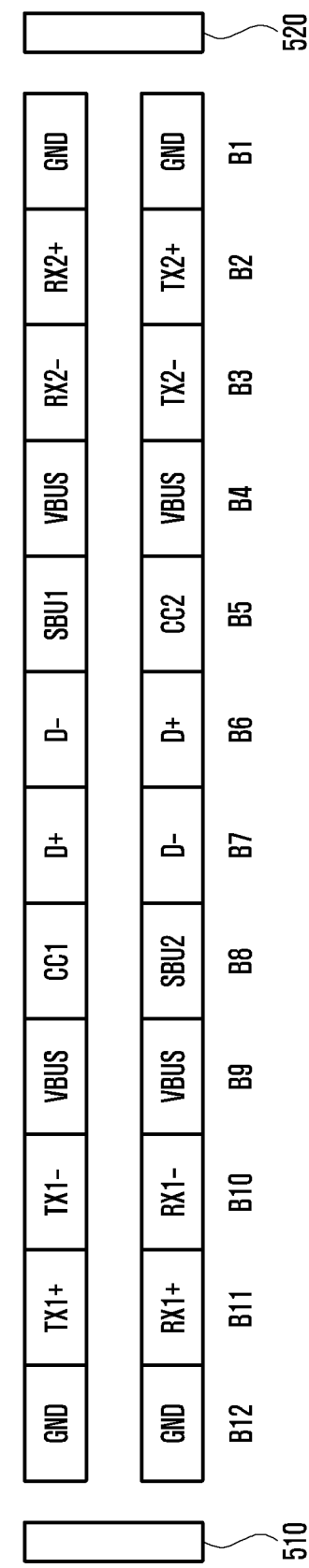
FIG. 5 is a diagram illustrating an example structure of a connector that can be applied to an electronic device according to various example embodiments of the present disclosure.

FIG. 5 is a diagram illustrating an example structure of a connector that can be applied to an electronic device according to various example embodiments of the present disclosure.

A USB Type-C defines a physical specification of pins of a connector (plug and socket) in order to insert a plug into a socket regardless with a direction, and as illustrated in FIG. 5, the electronic device (e.g., the electronic device 201) may have a connector (e.g., the socket 470) according to the USB Type-C.

A first pin set A1-A12 may be disposed within the connector. Further, a second pin set B1-B12 has the same pin configuration as that of the first pin set, but is different from the first pin set in only pin order and may be disposed under the first pin set A1-A12.

The pins A1 (B1) and A12 (B12) may be electrically connected to the ground GND of the electronic device and be electrically connected to the ground GND of another electronic device through terminals of a plug corresponding to the pins A1 (B1) and A12 (B12). The pins A4 (B4) and A9 (B9) may be electrically connected to a power source Vbus (e.g., 5V DC) of the electronic device and be electrically connected to a power source Vbus of another electronic device through a terminal of a plug corresponding to the pins A4 (B4) and A9 (B9).

The pins A2, A3, A10, and A11 (B2, B3, B10, and B11) may be used as a port for high speed data communication according to USB 3.0 between electronic devices.

The pins A6 and A7 (B6 and B7) may be used as a port for data communication according to USB 2.0 between electronic devices.

The pin A6 (configuration channel 1 (CC1) and the pin B6 (CC2)) may be electrically connected to the controller (e.g., the USB 274). The CC1 and CC2 may have various electric states (e.g., a voltage of a corresponding pin or a current flowing a corresponding pin has a specific value). When the controller recognizes such an electric state, the controller may detect whether an external device is connected and distinguish a kind of the connected external device. For example, the controller sends "identification information representing a kind of another electronic device" connected to the processor (e.g., the processor 210), and the processor may determine another electronic device to a sink or a source based on the identification information. When another electronic device is determined to a sink, the processor may control operation of supplying power of the battery to the sink through a power port A4 or A9. When another electronic device is determined to a source, the processor may control operation of charging the battery with power supplied through the power port A4 or A9.

When a connected cable is distinguished as an active cable (e.g., when a circuit is provided within a corresponding cable), one of CC1 and CC2 may be used as a port for supplying power (e.g., Vconn defined in a USB Type-C) to the active cable.

The pin A8 (secondary bus 1 (SBU1) and the pin B9 (SBU2)) may be used as a port for a specific function, for example, sound signal reception.

The connector (e.g., the socket 470) is used for additionally detecting whether the external device is connected and may include, for example, a latch pin. For example, a first pin 510 and a second pin 520 may be additionally disposed at both sides, respectively, of the pin sets. The first pin 510 and the second pin 520 may be electrically connected to the processor (e.g., the processor 210). The processor may detect an electric state of the first pin 510 and the second pin 520 to determine whether the external device is connected. Further, the processor may detect an electric state of the first pin 510 and the second pin 520 to determine whether a state change of the pin CC1 or CC2 is a normal change. An overvoltage (e.g., electro static discharge (ESD), electrical over stress (EOS)) may be entered into the processor through the first pin 510 and the second pin 520. An electronic component for preventing such an overvoltage from being entered may be disposed between the pins 510 and 520 and the processor.

Figure 6:
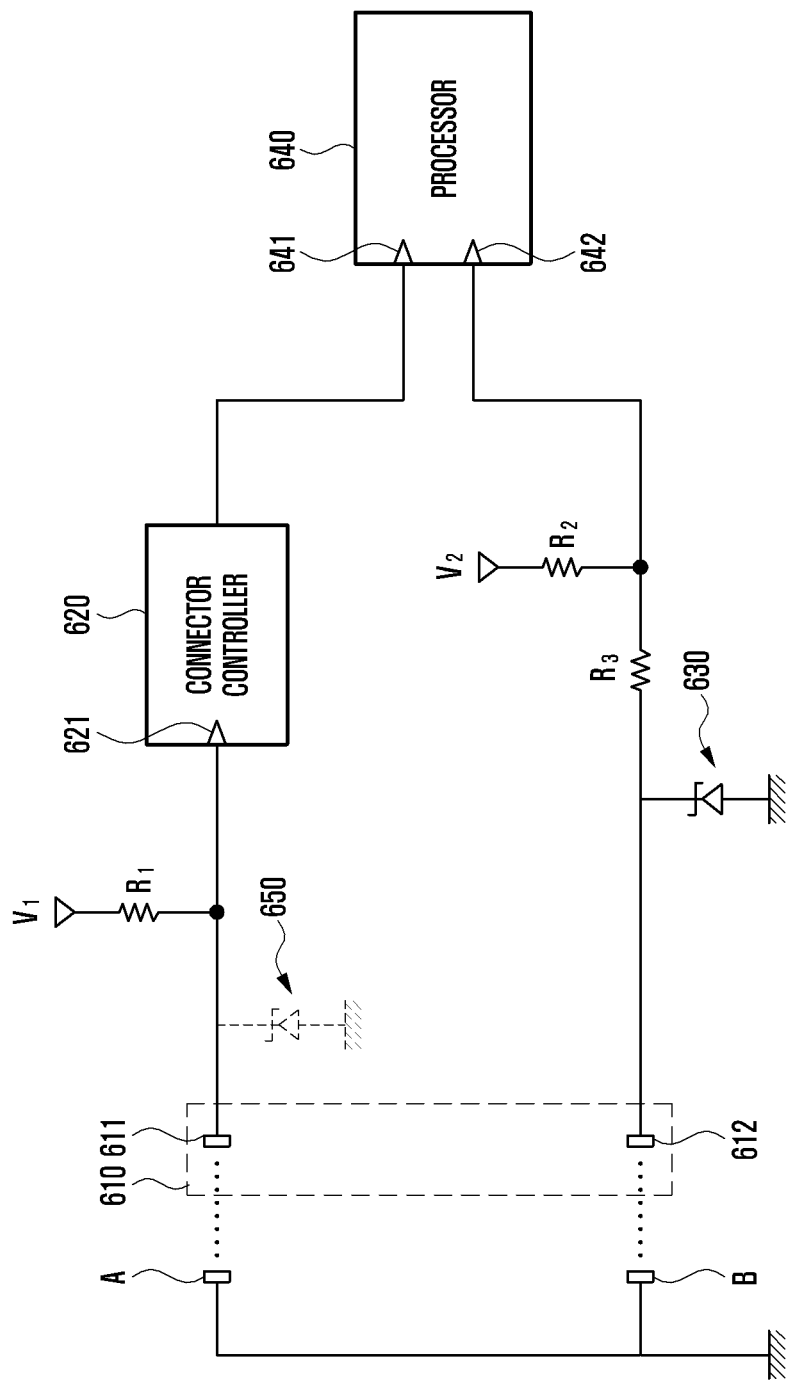
FIG. 6 is a diagram illustrating an example configuration of an electronic device according to various example embodiments of the present disclosure.

FIG. 6 is a diagram illustrating an example configuration of an electronic device (e.g., including various circuitry) according to various example embodiments of the present disclosure.

With reference to FIG. 6, the electronic device (e.g., the electronic device 201) may include a connector 610, controller (e.g., including processing circuitry) 620, transient voltage suppressor (TVS) diode 630, and processor (e.g., including processing circuitry) 640.

An input terminal 621 of the controller 620 may be electrically connected to a first terminal 611 (e.g., A5 or B5) of the connector 610. Further, the controller input terminal 621 may be electrically connected to a power source V1 through a first pull up resistor R1.

When the connector first terminal 611 is connected to a first terminal A of an external device (e.g., the cable 499), an electric state of the connector first terminal 611 may be changed. For example, when the connector first terminal 611 is electrically connected to the ground GND through a first terminal A of an external device, a voltage level of the connector first terminal 611 may be changed from high (e.g., $V1-V\_R1$) to low (e.g., $V0<(V1-V1\_R1)$). Here, the ground GND is, for example, an external structure of the plug 499a and may be a metal housing electrically connected to a first terminal A of the external device.

The controller 620 may recognize that a voltage level of the connector first terminal 611 is changed from high to low (e.g., when a first terminal A of the external device contacts the connector first terminal 611). Further, the controller 620 may recognize that a voltage level of the connector first terminal 611 is changed from low to high (e.g., when a first terminal A of the external device is released from contact with the connector first terminal 611).

The controller 620 may generate a signal corresponding to an electric state of the connector first terminal 611 to output the signal to a first input terminal 641 of the processor 640. For example, when an electric state is a high level, the controller 620 may output a digital value "1" to the processor first input terminal 641. When an electric state is a low level, the controller 620 may output a digital value "0" to the processor first input terminal 641.

A second input terminal 642 (e.g., general purpose input output (GPIO)) of the processor 640 may be electrically connected to a power source V2 through a second pull up resistor R2. Here, a voltage of the power source V2 may be the same as that of the power source V1. Further, the processor second input terminal 642 may be electrically connected to a second terminal 612 of the connector 610 through a pull down resistor R3.

When the connector second terminal 612 is connected to a second terminal B of an external device (e.g., the cable 499), an electric state of the connector second terminal 612 may be changed. For example, when the connector second terminal 612 is electrically connected to the ground GND through the external device second terminal B, a voltage level of the connector second terminal 612 may be changed from high (e.g., V2−V_R2+R3) to low (e.g., V0<(V2−V_R2+R3)). The processor 640 may recognize that a voltage level of the connector second terminal 612 is changed from high to low to determine that an external device is connected to the connector 610. The processor 640 may recognize that a voltage level of the connector second terminal 612 is changed from low to high to determine that a connection of the external device to the connector 610 is released.

Because the connector 610 (e.g., the socket 470) is exposed to the outside, moisture or dust may be entered into the connector 610. In such an entrance state, when a voltage (e.g., Vconn) is supplied to the connector first terminal 611 (e.g., A5, B5), corrosion thereof may be accelerated. Accordingly, even if the connector first terminal 611 contacts the external device second terminal B, the connector first terminal 611 may be electrically opened with the external device second terminal B. The processor 640 may determine whether an electric state of the connector first terminal 611 is a normal state based on an electric state of the connector second terminal 612. For example, the processor 640 may perform operation of Table 1.

TABLE 1

| Electric state of connector first terminal 611 (voltage level) | Electric state of connector second terminal 612 (voltage level) | Determination of processor 640 |
| --- | --- | --- |
| High | High | Connection X of external device electric state "normal" of first terminal 611 |

TABLE 1-continued

| Electric state of connector first terminal 611 (voltage level) | Electric state of connector second terminal 612 (voltage level) | Determination of processor 640 |
| --- | --- | --- |
| Low | Low | Connection O of external device electric state "normal" of first terminal 611 |
| Low | High | Connection X of external device electric state "abnormal" of first terminal 611 |
| High | Low | Connection O of external device electric state "abnormal" of first terminal 611 |

An overvoltage (e.g., ESD) may be entered (input) into the connector first terminal 611 or the connector second terminal 612; thus, the controller 620 or the processor 640 may be damaged by the overvoltage. When an overvoltage entered into the connector first terminal 611, even if the controller 620 is damaged, the controller 620 performs a function as a block element to prevent and/or reduce secondary damage in which the processor 640 may be damaged. However, when an overvoltage is entered into the connector second terminal 612, the entered voltage is directly entered into the processor 640; thus, the processor 640 may be damaged.

The TVS diode 630 is an electronic component for preventing and/or reducing the processor 640 from being damaged by an input of an overvoltage (e.g., ESD) and may clip an entered overvoltage. For example, an input terminal of the TVS diode 630 may be electrically connected to the connector second terminal 612, and an output terminal thereof may be electrically connected to the ground GND of the electronic device. According to such a connection configuration, when a voltage of an input terminal of the TVS diode 630 is a threshold (e.g., 20V) or more, a current flows from the input terminal of the TVS diode 630 to an output terminal thereof, and a current flows from the input terminal of the TVS diode 630 to the processor second input terminal 642. When the voltage at the input terminal of the TVS diode 630 is less than the threshold, current is allowed to flow to the processor 640. The processor 640 may be avoid being damaged according to such current distribution.

According to various example embodiments of the present disclosure, as an electronic component for preventing and/or reducing damage of the controller 620, a second TVS diode 650 may be further included in the electronic device. As illustrated in FIG. 6, an input terminal of the second TVS diode 650 may be electrically connected to the connector first terminal 611, and an output terminal thereof may be electrically connected to the ground GND of the electronic device. Accordingly, the second TVS diode 650 clips an overvoltage entered into the connector first terminal 611, thereby preventing and/or reducing the controller 620 from being damaged.

Figure 7:
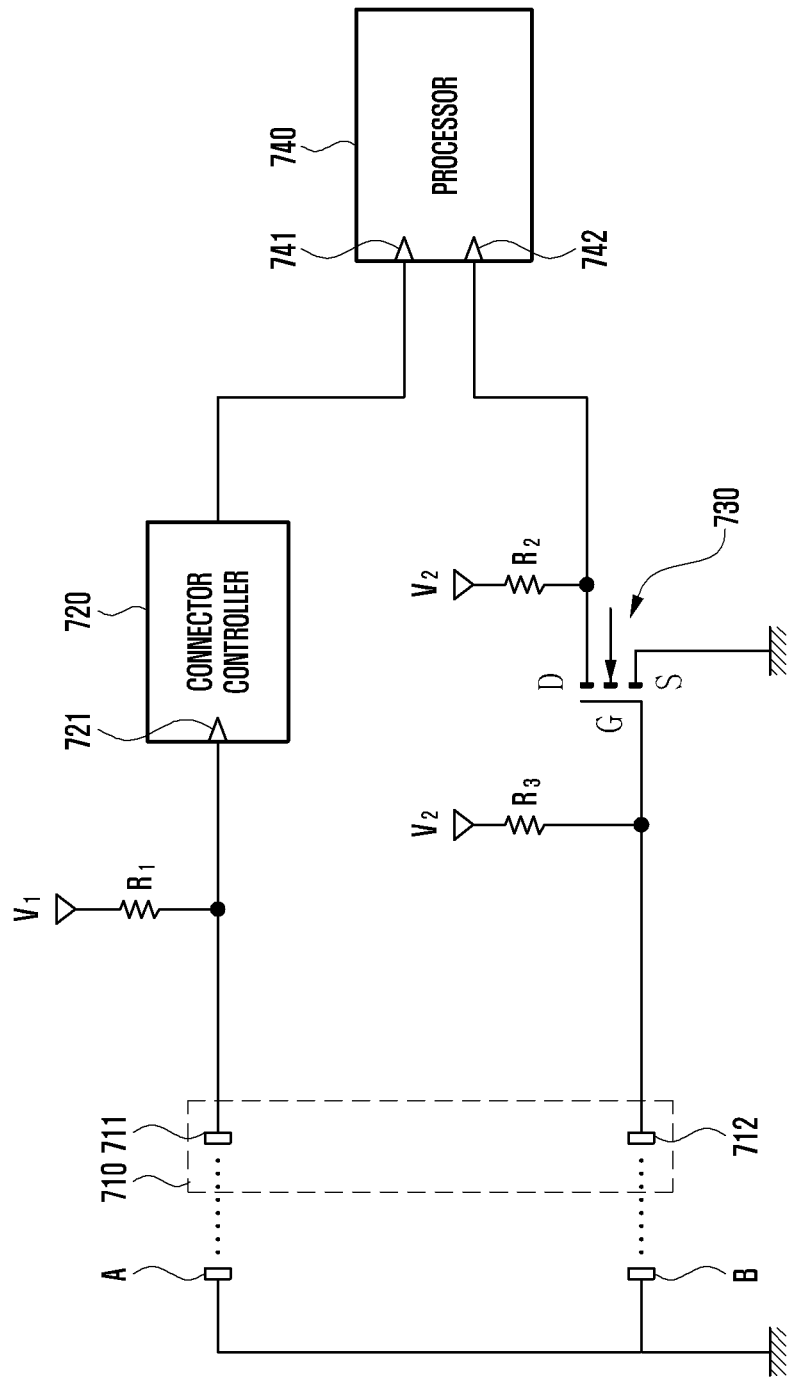
FIG. 7 is a diagram illustrating an example configuration of an electronic device according to various example embodiments of the present disclosure.

FIG. 7 is a diagram illustrating an example configuration of an electronic device according to various example embodiments of the present disclosure.

With reference to FIG. 7, the electronic device (e.g., the electronic device 201) may include a connector 710, controller (e.g., including processing circuitry) 720, N-channel metal oxide silicon field effect transistor (MOSFET) 730, and processor (e.g., including processing circuitry) 740.

An input terminal 721 of the controller 720 may be electrically connected to a first terminal 711 (e.g., A5 or B5) of the connector 710. Further, the controller input terminal 721 may be electrically connected to a power source V1 through a first pull up resistor R1. According to such a connection configuration, when the connector first terminal 711 is connected to a first terminal A of an external device (e.g., the cable 499), a voltage level of the connector first terminal 711 may be changed from high to low.

The controller 720 may generate a signal corresponding to an electric state (e.g., a voltage level of high or low) of the connector first terminal 711 to output the signal to a first input terminal 741 of the processor 740.

A second input terminal 742 (e.g., general purpose input output (GPIO)) of the processor 740 may be electrically connected to a power source V2 through a second pull up resistor R2. Further, the second input terminal 742 of the processor 740 may be electrically connected to a drain terminal D of the N-channel MOSFET 730. A source terminal S of the N-channel MOSFET 730 may be electrically connected to the ground GND of the electronic device. A gate terminal G of the N-channel MOSFET 730 may be electrically connected to a second terminal 712 of the connector 710. Further, the connector second terminal 712 may be electrically connected to a power source V2 through a third pull up resistor R3. Here, a voltage of the power source V2 may be the same as that of the power source V1.

According to a connection configuration between the N-channel MOSFET 730 and other electronic components, when the connector second terminal 712 is connected to a second terminal B of an external device (e.g., the cable 499), a voltage level of the connector second terminal 712 may be changed from high to low. Accordingly, the drain terminal D and the source terminal S may be short-circuited; thus, a voltage level of the drain terminal D may be changed from high to low.

The processor 740 may recognize that a voltage level of the drain terminal D is changed from high to low to determine that an external device is connected to the connector 710. The processor 740 may recognize that a voltage level of the drain terminal D is changed from low to high to determine that a connection of the external device to the connector 710 is released. The processor 740 may determine whether an electric state of the connector first terminal 711 is a normal state based on an electric state of the drain terminal D. For example, the processor 740 may perform operation of Table 2.

TABLE 2

| Electric state of connector first terminal 711 (voltage level) | Electric state of drain terminal D of N-channel MOSFET 730 (voltage level) | Determination of processor 740 |
| --- | --- | --- |
| High | High | Connection X of external device electric state "normal" of first terminal 711 |
| Low | Low | Connection O of external device electric state "normal" of first terminal 711 |
| Low | High | Connection X of external device electric state "abnormal" of first terminal 711 |

TABLE 2-continued

| Electric state of connector first terminal 711 (voltage level) | Electric state of drain terminal D of N-channel MOSFET 730 (voltage level) | Determination of processor 740 |
| --- | --- | --- |
| High | Low | Connection O of external device electric state "abnormal" of first terminal 711 |

According to a connection configuration between the N-channel MOSFET 730 and other electronic components, the N-channel MOSFET 730 may perform a function of blocking an electric connection between the connector second terminal 712 and the processor second input terminal 742. In other words, if an overvoltage (e.g., ESD or EOS) is entered into the gate terminal G through the connector second terminal 712, the drain terminal D and the source terminal S are opened; thus, an overvoltage may be blocked from being entered into the processor second input terminal 742 by the N-channel MOSFET 730. Therefore, an N-channel MOSFET rather than a TVS diode may also be effective as an electronic component for preventing and/or reducing damage of the processor.

According to various example embodiments of the present disclosure, the same configuration as a connection configuration between the N-channel MOSFET 730 and other electronic components may be added between the connector first terminal 711 and the controller 720. According to such an additional circuit configuration, an overvoltage may be blocked from being entered into the controller 720.

Figure 8:
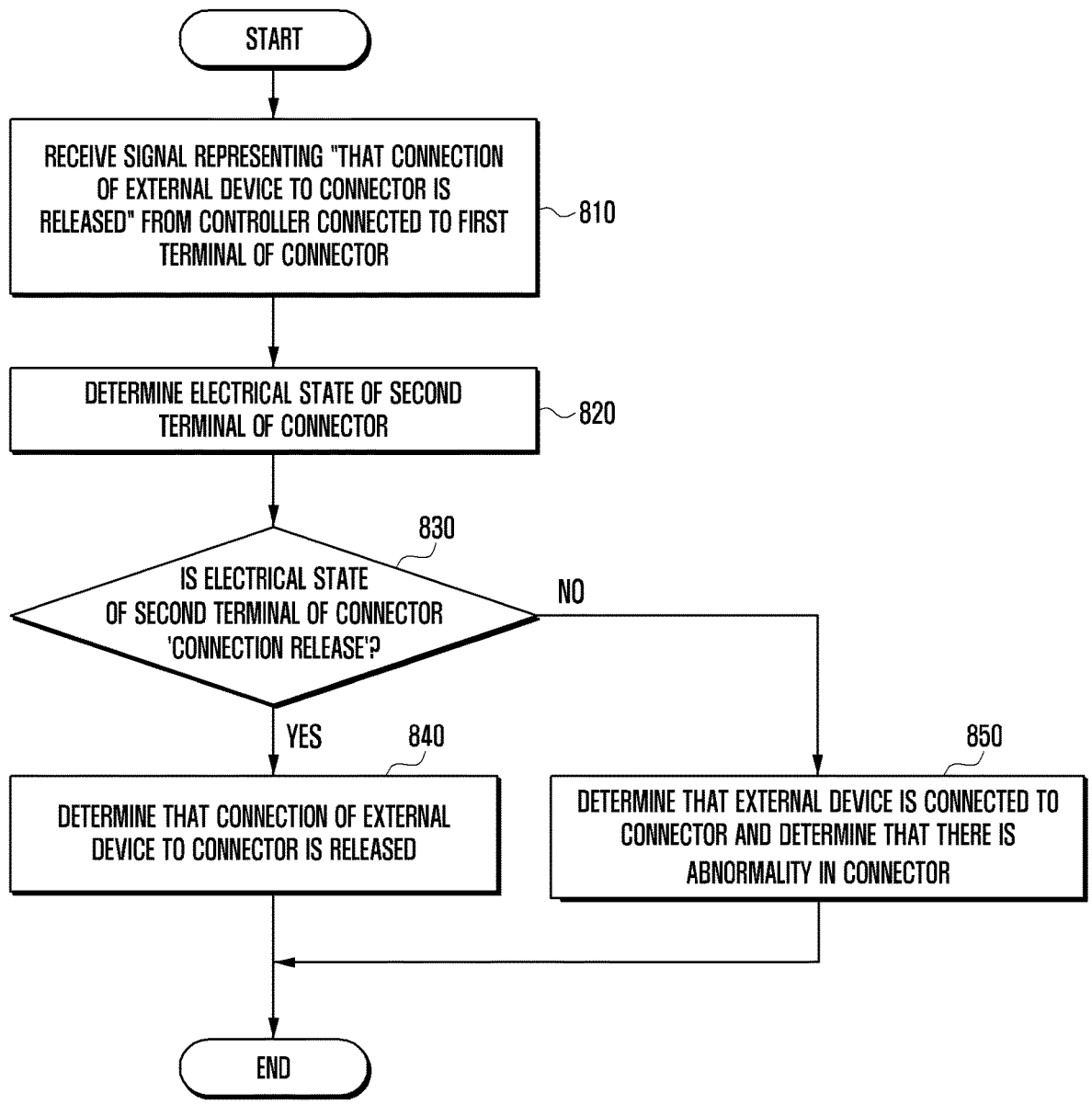
FIG. 8 is a flowchart illustrating example operations of an electronic device according to various example embodiments of the present disclosure.

FIG. 8 is a flowchart illustrating example operations of an electronic device according to various example embodiments of the present disclosure. Here, the electronic device (e.g., the electronic device 201) may include configurations of FIG. 6 or 7.

With reference to FIG. 8, a processor (e.g., the processor 640 or the processor 740) may receive a signal representing "that a connection of an external device to a connector is released" from a controller connected to a first terminal of the connector at operation 810.

The processor may determine an electrical state of a second terminal of the connector in response to reception of the signal at operation 820. For example, the processor may determine an electrical state of the second terminal 612 of the connector. In another example, the processor may determine an electrical state of the drain terminal D of an N-channel MOSFET 730 to determine an electrical state of the second terminal 712 of the connector.

The processor may determine whether an electrical state of the second terminal of the connector is 'connection release' at operation 830.

If an electrical state of the second terminal of the connector is 'connection release', the processor may determine that a connection of the external device to the connector is released at operation 840.

If an electrical state of the second terminal of the connector is not 'connection release', the processor may determine that the external device is connected to the connector at operation 850. Further, the processor may determine that there is abnormality in the connector and perform a corresponding additional function (e.g., notify to a user through a display).

An electronic device according to various example embodiments of the present disclosure includes a connector configured to provide a connection to an external device; a controller electrically connected to a first external device detection terminal of the connector and configured to detect an electrical state of the first external device detection terminal and to output a signal corresponding to the detected electrical state; a processor including a first input terminal electrically connected to the controller, and configured to receive the signal through the first input terminal, the processor further including a second input terminal electrically connected to a second external device detection terminal of the connector, the processor further configured to detect an electrical state of the second external device detection terminal; and an electronic circuit disposed between the second external device detection terminal and the processor configured to block and/or short an overvoltage so that the overvoltage does not enter into the processor through the second input terminal, e.g., protect the processor from receiving an overvoltage through the second input terminal.

The electronic component may include an N-channel metal oxide silicon field effect transistor (MOSFET), wherein a gate terminal of the N-channel MOSFET may be electrically connected to the second external device detection terminal, a drain terminal of the N-channel MOSFET may be electrically connected to the second input terminal, and a source terminal of the N-channel MOSFET may be connected to the ground of the electronic device.

The drain terminal may be electrically connected to a power source of the electronic device through a first pull up resistor, the gate terminal may be electrically connected to the power source through a second pull up resistor, when an electrical state of the gate terminal is changed from a high level to a low level, an electric state of the drain terminal may be changed from a high level to a low level, and when an electric state of the drain terminal is changed from a high level to a low level, the processor may be configured to determine that the external device is connected to the connector.

Even if the signal represents connection release, when an electrical state of the drain terminal is a low level, the processor may be configured to determine that the external device is connected to the connector.

First pin set A1 to A12 may be disposed within the connector according to a Universal Serial Bus (USB) Type-C, second pin set B1 to B12 having a same pin configuration as that of the first pin set may be disposed under the first pin set, and the first external device detection terminal may be a pin A6 or B6 in the USB Type-C.

The second external device detection terminal may be disposed in at least one of both sides of the pin sets.

The electronic circuit may include a transient voltage suppressor (TVS) diode, an input terminal of the TVS diode may be electrically connected to the second external device detection terminal, and an output terminal of the TVS diode may be connected to the ground of the electronic device.

The input terminal may be electrically connected to a power source of the electronic device through a pull up resistor, and when an electric state of the input terminal is changed from a high level to a low level, the processor may be configured to determine that the external device is connected to the connector.

Even if the signal represents connection release, when an electrical state of the input terminal is a low level, the processor may be configured to determine that the external device is connected to the connector.

The electronic device may further include a second electronic circuit disposed between the first external device detection terminal and the controller such that an overvoltage is not entered into the controller through the first external device detection terminal.

The second electronic component may include an N-channel MOSFET or a TVS diode.

The second input terminal may be a general purpose input output (GPIO) terminal.

The processor may include an application processor.

The connector may be a socket exposed to the outside through a side surface in an external structure of the electronic device.

According to various example embodiments of the present disclosure, an electronic device that can protect a processor from an overvoltage entered through a connector can be provided.

Although example embodiments of the present disclosure have been described in detail hereinabove with reference to various example embodiments, it should be clearly understood that many variations and modifications of the disclosure herein described which may appear to those skilled in the art will still fall within the spirit and scope of the example embodiments of the present disclosure as defined in the appended claims and their equivalents.

What is claimed is:

1. An electronic device, comprising:
a connector configured to provide a connection to an external device;
a controller electrically connected to a first external device detection terminal of the connector, the controller configured to detect an electrical state of the first external device detection terminal and to output a signal corresponding to the detected electrical state;
a processor including a first input terminal electrically connected to the controller, the processor being configured to receive the signal through the first input terminal, the processor further including a second input terminal electrically connected to a second external device detection terminal of the connector, wherein the processor is further configured to detect an electrical state of the second external device detection terminal; and
an electronic circuit disposed between the second external device detection terminal and the processor, the electronic circuit configured to protect the processor from receiving an overvoltage through the second input terminal.

2. The electronic device of claim 1, wherein the electronic circuit comprises an N-channel metal oxide silicon field effect transistor (MOSFET), wherein
a gate terminal of the N-channel MOSFET is electrically connected to the second external device detection terminal,
a drain terminal of the N-channel MOSFET is electrically connected to the second input terminal, and
a source terminal of the N-channel MOSFET is connected to a ground of the electronic device.

3. The electronic device of claim 2, wherein the drain terminal is electrically connected to a power source of the electronic device through a first pull up resistor,
the gate terminal is electrically connected to the power source of the electronic device through a second pull up resistor, wherein the N-channel MOSFET is arranged such that when an electric state of the gate terminal is changed from a high level to a low level, an electrical state of the drain terminal is changed from a high level to a low level, and
the processor is configured to determine that the external device is connected to the connector when an electrical state of the drain terminal is changed from a high level to a low level.

4. The electronic device of claim 3, wherein the processor is configured to determine that the external device is connected to the connector, when an electric state of the drain terminal is a low level, even if the signal represents connection release.

5. The electronic device of claim 1, wherein a first pin set A1 to A12 is disposed within the connector according to a Universal Serial Bus (USB) Type-C,
a second pin set B1 to B12 having the same pin configuration as that of the first pin set is disposed under the first pin set, and
the first external device detection terminal is a pin A6 and/or B6 in the USB Type-C.

6. The electronic device of claim 5, wherein the second external device detection terminal is disposed in at least one of both sides of the first and second pin sets.

7. The electronic device of claim 1, wherein the electronic circuit comprises a transient voltage suppressor (TVS) diode,
an input terminal of the TVS diode is electrically connected to the second external device detection terminal, and
an output terminal of the TVS diode is connected to a ground of the electronic device.

8. The electronic device of claim 7, wherein the input terminal of the TVS diode is electrically connected to a power source of the electronic device through a pull up resistor, and
the processor is configure to determine that the external device is connected to the connector when an electrical state of the input terminal is changed from a high level to a low level.

9. The electronic device of claim 8, wherein the processor is configured to determine that the external device is connected to the connector, when an electrical state of the input terminal is a low level, even if the signal represents connection release.

10. The electronic device of claim 1, further comprising an electronic circuit disposed between the first external device detection terminal and the controller, the electronic circuity configured to protect the controller from receiving an through the first external device detection terminal.

11. The electronic device of claim 10, wherein the electronic circuit comprises at least one of: an N-channel MOSFET and a TVS diode.

12. The electronic device of claim 1, wherein the second input terminal is a general purpose input output (GPIO) terminal.

13. The electronic device of claim 1, wherein the processor comprises an application processor.

14. The electronic device of claim 1, wherein the connector comprises a socket exposed to the outside through a side surface of an external structure of the electronic device.

* * * * *